US012422123B1

(12) United States Patent
Xie

(10) Patent No.: US 12,422,123 B1
(45) Date of Patent: Sep. 23, 2025

(54) LANTERN-SHAPED DECORATIVE LAMP AND LIGHTING DEVICE

(71) Applicant: Nengde Xie, Fujian (CN)

(72) Inventor: Nengde Xie, Fujian (CN)

( * ) Notice: Subject to any disclaimer, the term of this patent is extended or adjusted under 35 U.S.C. 154(b) by 0 days.

(21) Appl. No.: 19/234,733

(22) Filed: Jun. 11, 2025

(51) Int. Cl.
*F21V 1/06* (2006.01)
*F21V 3/02* (2006.01)

(52) U.S. Cl.
CPC ................ *F21V 1/06* (2013.01); *F21V 3/023* (2013.01)

(58) Field of Classification Search
CPC ..... F21V 1/06; F21V 3/023; F21S 4/10; F21S 4/15
See application file for complete search history.

(56) References Cited

U.S. PATENT DOCUMENTS 623,576 A * 4/1899 Sprague .................... F21V 1/06 362/162
2,796,517 A * 6/1957 Herzfelder ................ F21V 1/06 428/34.1
3,162,377 A * 12/1964 Ozeki ....................... F21V 1/06 362/450
3,745,332 A * 7/1973 Weisbrod .................. F21V 1/26 362/357
4,167,034 A * 9/1979 Noguchi ................. F21V 21/06 D26/112
4,229,784 A * 10/1980 Noguchi ................. F21S 6/005 362/361
5,791,773 A * 8/1998 Babineaux ............. G03B 15/07 362/399
5,893,636 A * 4/1999 Babineaux ................ F21V 1/06 362/399
6,305,827 B1 * 10/2001 Nolle ...................... F21V 3/023 362/399
6,960,004 B1 * 11/2005 Hsieh ........................ F21V 1/06 362/450
8,192,044 B2 * 6/2012 Allsop .................... F21S 9/037 362/438
D705,499 S * 5/2014 Zamarripa ................... D30/128
8,764,234 B1 * 7/2014 Acree ........................ F21S 4/15 362/249.04
10,161,602 B1 * 12/2018 Bleile ................... F21V 17/166
2002/0141184 A1 * 10/2002 Shieh ........................ B44C 5/00 362/249.07
2006/0279956 A1 * 12/2006 Richmond .............. F21V 15/01 362/803
2010/0097812 A1 * 4/2010 Cheng ....................... F21S 4/10 362/382
2016/0146410 A1 * 5/2016 Moscone .............. F21V 17/007 362/123
2019/0219250 A1 * 7/2019 Preutz ..................... F21V 3/023
2021/0341135 A1 * 11/2021 Hale ..................... F21V 17/007

* cited by examiner

*Primary Examiner* — Zheng Song
(74) *Attorney, Agent, or Firm* — HOWARD M COHN and Associates, LLC

(57) ABSTRACT

A lantern-shaped decorative lamp and a lighting device are provided. The lantern-shaped decorative lamp includes a skeleton, a lighting component, and a flexible lampshade. The skeleton is unfoldable or collapsable in a vertical direction. The lighting component is mounted on the skeleton. The flexible lampshade is wrapped around an outer side of the skeleton. In an unfolded state, the skeleton and the flexible lampshade are unfolded to unfold the lantern-shaped decorative lamp. In a storage state, the skeleton and the flexible lampshade are collapsed in the vertical direction to minimize a volume of the lantern-shaped decorative lamp.

18 Claims, 8 Drawing Sheets

LANTERN-SHAPED DECORATIVE LAMP AND LIGHTING DEVICE

TECHNICAL FIELD

The present disclosure relates to a technical field of lighting devices and in particular to a lantern-shaped decorative lamp and a lighting device.

BACKGROUND

A lantern is a traditional decorative lamp. In the related art, a light-emitting device and a lantern body are separately disposed. The light-emitting device needs to be mounted on the lantern body before use, which makes a mounting operation cumbersome.

SUMMARY

The present disclosure provides a lantern-shaped decorative lamp and a lighting device, which simplify a mounting process and improve a user experience.

In a first aspect, embodiments of the present disclosure provide the lantern-shaped decorative lamp. The lantern-shaped decorative lamp comprises a skeleton, a lighting component, and a flexible lampshade. The skeleton is unfoldable or collapsable in a vertical direction. The lighting component is mounted on the skeleton. The flexible lampshade is wrapped around an outer side of the skeleton. In an unfolded state, the skeleton and the flexible lampshade are unfolded to unfold the lantern-shaped decorative lamp. In a storage state, the skeleton and the flexible lampshade are collapsed in the vertical direction to minimize a volume of the lantern-shaped decorative lamp.

In some embodiments, the lighting component is a light strip. The light strip extends in an extending direction of the skeleton and is fixed to the skeleton.

In some embodiments, the skeleton comprises support rings coaxially disposed from top to bottom. The support rings are attached to an inner wall surface of the flexible lampshade. Diameters of the support rings are matched with an inner diameter of the flexible lampshade from top to bottom. The support rings are adapted to an outer contour of the flexible lampshade.

In some embodiments, the skeleton further comprises a counterweight piece. The counterweight piece is connected to a middle lower position of the flexible lampshade. When the flexible lampshade is in a hanging state, a lower portion of the flexible lampshade automatically unfolds under gravity of the counterweight piece.

In some embodiments, the counterweight piece is a counterweight ring. The counterweight ring and the support rings are coaxially disposed. The counterweight ring is attached to the inner wall surface of the flexible lampshade. The counterweight ring is connected to a bottom end of the flexible lampshade.

In some embodiments, a thickness of the counterweight ring is greater than a thickness of any one of the support rings.

In some embodiments, the counterweight piece comprises at least one counterweight block, and the at least one counterweight block is connected to one of the support rings located on a lower portion of the lantern-shaped decorative lamp.

In some embodiments, the skeleton comprises a frame formed by spirally winding a metal wire, and the frame is attached to an inner wall surface of the flexible lampshade.

In some embodiments, the skeleton further comprises a first fixing ring and a second fixing ring. The first fixing ring is connected to a top end of the frame, and the second fixing ring is connected to a bottom end of the frame. A weight of the second fixing ring is greater than a weight of the first fixing ring, or at least one counterweight block is disposed on the second fixing ring, so that a lower portion of the flexible lampshade automatically unfolds under gravity of the second fixing ring when the flexible lampshade is in a hanging state.

In some embodiments, the light strip comprises lamp beads disposed at intervals. A distance between any two adjacent lamp beads is not less than 3 cm and not greater than 10 cm.

In some embodiments, in the unfolded state, the flexible lampshade is in a sphere shape. Opening are respectively defined on a top end and a bottom end of the flexible lampshade, and the openings communicate an internal space of the flexible lampshade with an outside.

In some embodiments, the flexible lampshade comprises first connecting pieces, and the first connecting pieces are sequentially spliced in a circumferential direction of the lantern-shaped decorative lamp to form the flexible lampshade of a spherical shape.

In some embodiments, the flexible lampshade comprises an inner lampshade and a decorative outer lampshade. The inner lampshade comprises the first connecting pieces and the inner lampshade is connected to the skeleton. The decorative outer lampshade comprises second connecting pieces, and the second connecting pieces are sequentially spliced and detachably connected to an outer surface of the inner lampshade.

In some embodiments, the second connecting pieces jointly define at least one hollow pattern area for transmitting light.

In some embodiments, the lantern-shaped decorative lamp further comprises a hanging assembly. The hanging assembly comprises a connecting rope and a hook connected to the connecting rope. The skeleton further comprises a connecting ring. The connecting ring is connected to a top end of the flexible lampshade. Two opposite sides of the connecting ring are protruded upward to define connecting portions and connecting grooves. The connecting grooves face downward. The connecting rope is connected to the connecting ring and two ends of the connecting rope are respectively disposed in the connecting grooves.

In some embodiments, the connecting ring is connected to the flexible lampshade except for portions where the connecting portions are disposed, so that the connecting grooves and the flexible lampshade jointly define connecting holes, and the connecting rope passes through the connecting holes.

In some embodiments, the lantern-shaped decorative lamp further comprises a control device and a battery. The control device is configured to control a color of light emitted by the light strip and/or control a flashing frequency of the light strip. The battery is configured to supply power to the light strip and the control device.

In some embodiments, the lantern-shaped decorative lamp further comprises a photosensitive sensor. The photosensitive sensor is in communication with the control device. When the photosensitive sensor detects that an ambient light intensity is less than a predetermined threshold, the control device is configured to control the light strip to emit light.

In some embodiments, the lantern-shaped decorative lamp further comprises a control box, and the control device and the battery are disposed in the control box.

The battery is a solar cell. The photosensitive sensor is mounted on the control box or the skeleton.

In a second aspect, the present disclosure provides the lighting device. The lighting device comprises a plurality of lantern-shaped decorative lamps mentioned above. The plurality of lantern-shaped decorative lamps shares the light strip. The light strip sequentially passes through the skeletons of the plurality of lantern-shaped decorative lamps. Each two adjacent lantern-shaped decorative lamps are spaced. A first trip section of the light strip disposed in each skeleton is configured as a main light-emitting section of the light strip. A second trip section of the light strip disposed between each two adjacent lantern-shaped decorative lamps is configured as a connecting section of the light strip.

In the present disclosure, the skeleton is able to be unfolded and collapsed in the vertical direction. When the lantern-shaped decorative lamp is needed, the user can easily unfold the skeleton to form a three-dimensional support structure, so that the flexible lampshade quickly presents a shape of a lantern without complicated assembly steps. When not in use, the user can quickly fold the skeleton, thereby saving a lot of storage space. For merchants, during inventory management, the lantern-shaped decorative lamp in the storage state occupies a small volume of a warehouse and reduces storage costs. For individual users, when the lantern-shaped decorative lamp is not in use, it is easy to store the lantern-shaped decorative lamp without taking up too much home space. During transportation, the lantern-shaped decorative lamp in the storage state is small in size, and more lantern-shaped decorative lamps are allowed to be loaded in a limited transportation space, which improves transportation efficiency and reduces transportation costs. The lighting component is mounted on the skeleton, and the lighting component is positioned when the skeleton is unfolded, thereby saving mounting time and labor costs. The flexible lampshade is wrapped around the outer side of the outside, so that the light emitted by the lighting component mounted on the outside is evenly emitted through the flexible lampshade, creating a soft and warm atmosphere.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

In the drawings.

Figure 1:
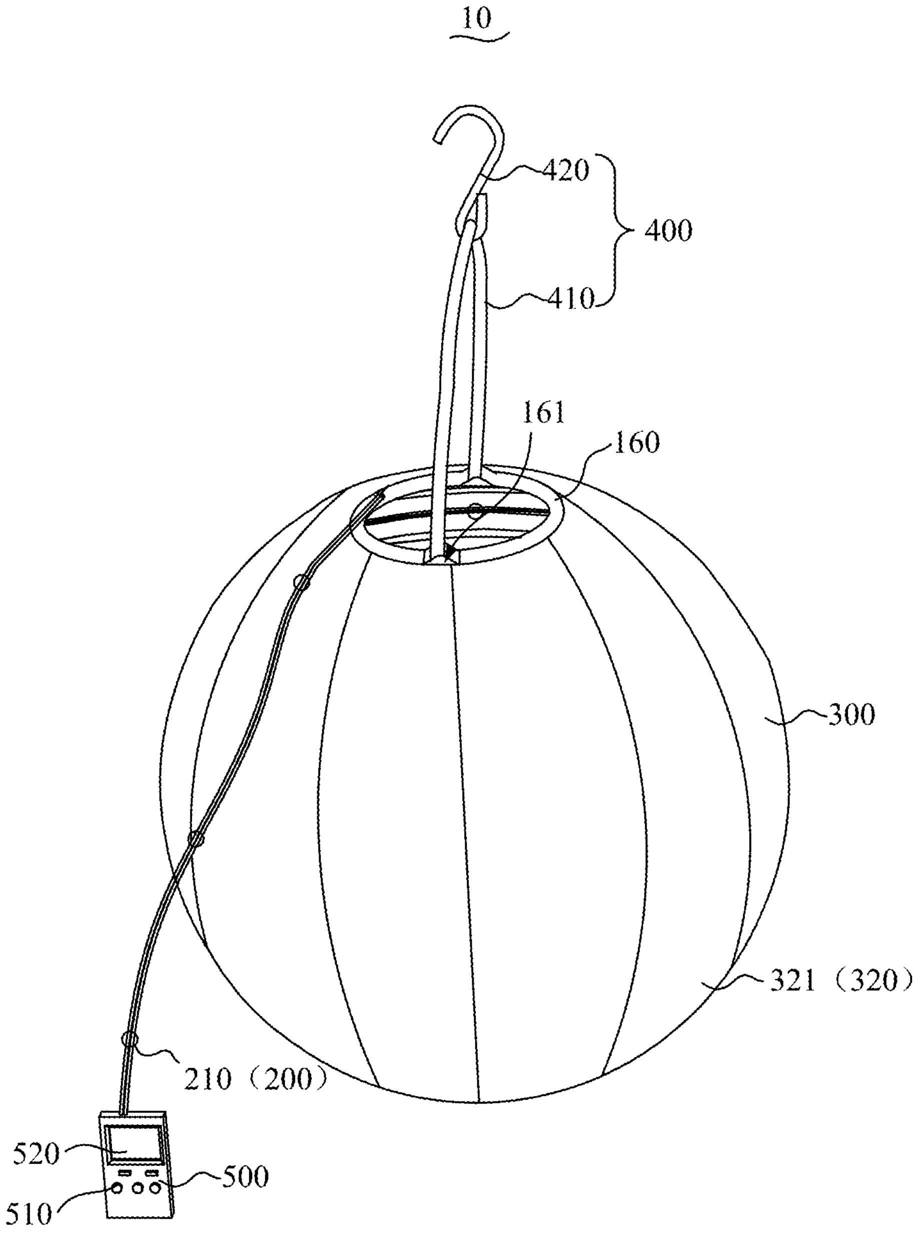
FIG. 1 is a schematic diagram of a lantern-shaped decorative lamp shown in an unfolded state of the present disclosure.

1—lighting device; 10—lantern-shaped decorative lamp; 100—skeleton; 110—support ring; 120—counterweight piece; 121—counterweight ring; 122—counterweight block; 130—frame; 140—first fixing ring; 150—second fixing ring; 160—connecting ring; 161—connecting groove; 200—lighting component; 210—light strip; 220—lamp bead; 230—main light-emitting section; 240—connecting section; 300—flexible lampshade; 310—inner lampshade; 311—first connecting piece; 320—decorative outer lampshade; 321—second connecting piece; 400—hanging assembly; 410—connecting rope; 420—hook; 500—control box; 510—control device; 520—battery; 600—photosensitive sensor.

Realization of purposes, functional features, and advantages of the present disclosure is further explained in conjunction with embodiments and with reference to the accompanying drawings.

DETAILED DESCRIPTION

In order to make the purpose, technical solutions, and advantages of the present disclosure clear, the following section will further describe the embodiments of the present disclosure in detail with reference to the accompanying drawings.

When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as “first” and “second” are only used for the purpose of description, rather than being understood to indicate or imply relative importance or hint the number of indicated technical features. Thus, the feature limited by “first” and “second” can explicitly or implicitly comprise at least one feature. Unless otherwise indicated, the term “a plurality of” means two or more. The term “and/or” depicts the relationship between associated objects and there are three relationships thereon. For example, A and/or B may indicate A exists alone, A and B exist at the same time, and B exists alone. The character “/” generally indicates that the associated object is alternative. The terms “first”, “second”, “third”, etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term "and/or" comprises all combinations of one or more of the associated listed items.

A lantern is a traditional decorative lamp. In the related art, a light-emitting device and a lantern body are separately disposed. The light-emitting device needs to be mounted on the lantern body before use, which makes a mounting operation cumbersome.

Figure 2:
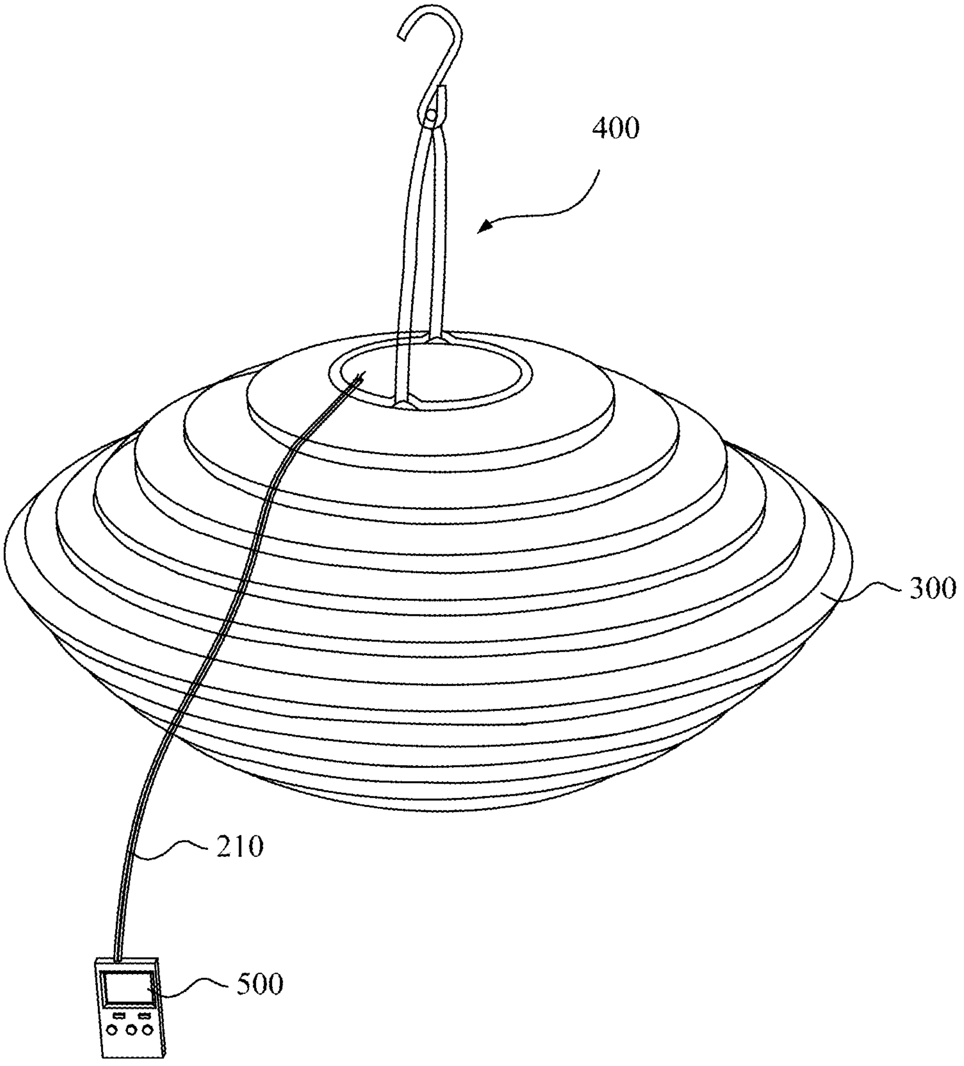
FIG. 2 is a schematic diagram of the lantern-shaped decorative lamp shown in a partially collapsed state of the present disclosure.
Figure 3:
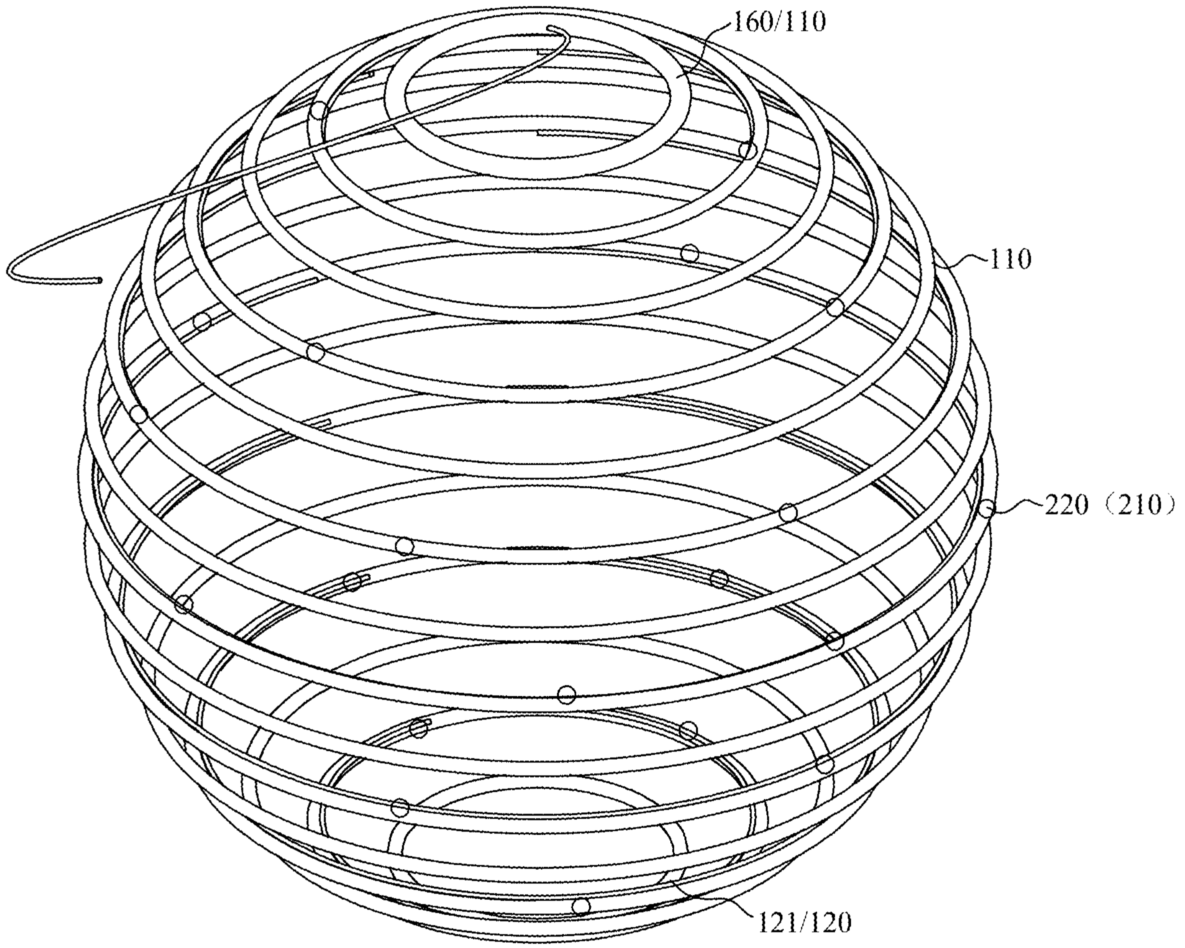
FIG. 3 is a schematic diagram of a skeleton according to a first embodiment of the present disclosure.

To solve the problems in the related art, in a first aspect, as shown in FIGS. 1-3, embodiments of the present disclosure provide a lantern-shaped decorative lamp 10. The lantern-shaped decorative lamp 10 comprises a skeleton 100, a lighting component 200 and a flexible lampshade 300. The skeleton 100 is unfoldable or collapsable in a vertical direction. The lighting component 200 is mounted on the skeleton 100. The flexible lampshade 300 is wrapped around an outer side of the skeleton 100. As shown in FIG. 1, in an unfolded state, the skeleton 100 and the flexible lampshade 300 are unfolded to unfold the lantern-shaped decorative lamp 10. As shown in FIG. 2, in a storage state, the skeleton 100 and the flexible lampshade 300 are collapsed in the vertical direction to reduce a volume of the lantern-shaped decorative lamp 10.

In the present disclosure, the skeleton 100 and the flexible lampshade 300 are fixed together by bonding, sewing, etc., which is not limited thereto.

The skeleton 100 is able to be unfolded and collapsed in the vertical direction, thereby driving the flexible lampshade to unfold and collapse. The lighting component 200 is directly mounted and fixed on the skeleton 100. When the lantern-shaped decorative lamp is needed, the user only needs to unfold the skeleton 100, and the lighting component 200 is in a suitable position. Compared with a solution where the light-emitting piece needs to be mounted on the lantern body by the user in the related art, the lantern-shaped decorative lamp 10 is simple to mount and easy to operate, which saves mounting time. The flexible lampshade 300 is wrapped around the outer side of the skeleton 100, so that the light is evenly emitted out, creating a soft and warm atmosphere. Moreover, when the skeleton 100 is unfolded, the skeleton 100 and the flexible lampshade 300 cooperate to form a three-dimensional support structure, presenting a lantern shape. When not in use, the skeleton 100 is quickly folded up to save storage space. For merchants, during inventory management, the lantern-shaped decorative lamp 10 in the storage state occupies a small volume of a warehouse and reduces storage costs. For individual users, when the lantern-shaped decorative lamp 10 is not in use, it is easy to store the lantern-shaped decorative lamp 10 without taking up too much home space. During transportation, the lantern-shaped decorative lamp 10 in the storage state is small in size, and more lantern-shaped decorative lamp 10*s* are allowed to be loaded in a limited transportation space, which improves transportation efficiency and reduces transportation costs.

In some embodiments, as shown in FIGS. 1-2, the lighting component 200 is a light strip 210. The light strip 210 extends in an extending direction of the skeleton 100 and is fixed to the skeleton 100. The light strip 210 is fixed to the skeleton 100 in the extending direction of the skeleton 100, and no complicated wiring or positioning operation is needed, and a mounting process is relatively simple. The light strip 210 is fixed to the skeleton 100 by bonding, winding or snap connection, which is not limited thereto.

Figure 4:
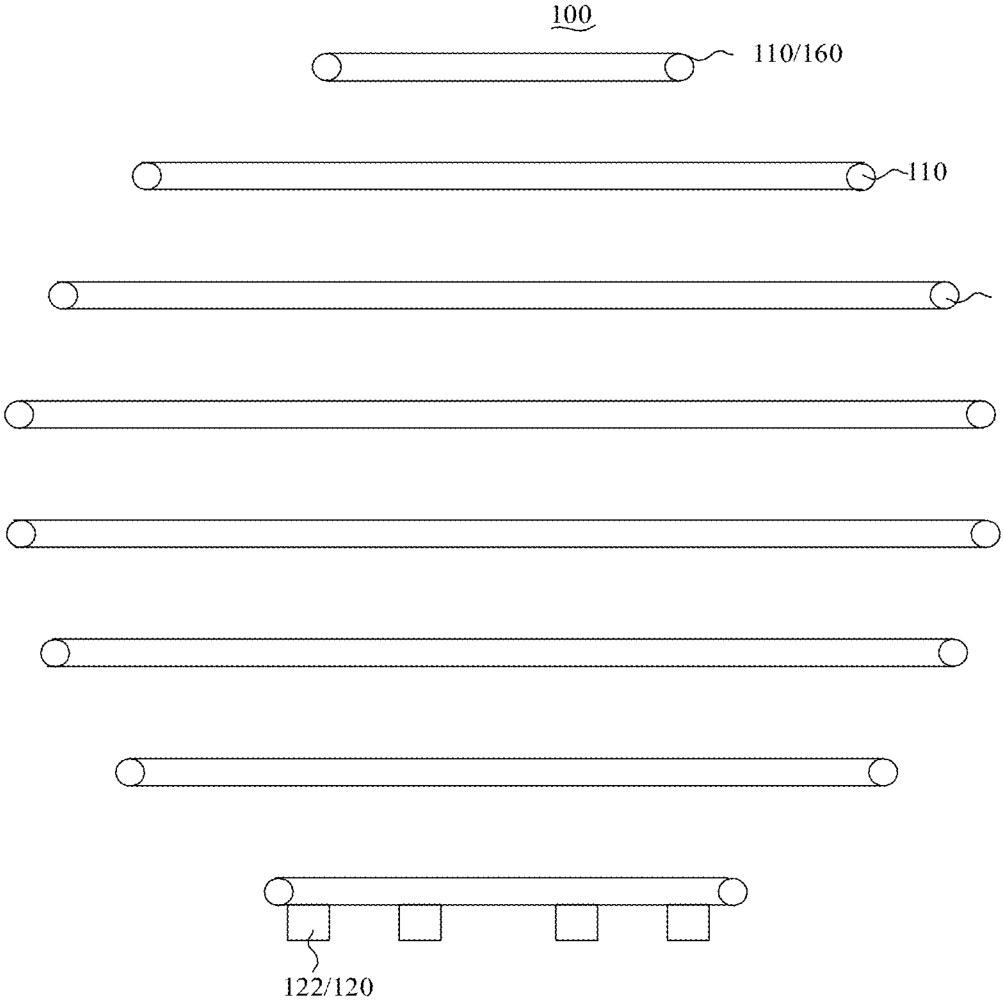
FIG. 4 is a cross-sectional schematic diagram of the skeleton according to the first embodiment of the present disclosure.

In some embodiments, as shown in FIGS. 3-4, the skeleton 100 comprises support rings 110 coaxially disposed from top to bottom. The support rings 110 are attached to an inner wall surface of the flexible lampshade 300. Diameters of the support rings 110 are matched with an inner diameter of the flexible lampshade 300 from top to bottom. The support rings 110 are adapted to an outer contour of the flexible lampshade 300.

For instance, when the flexible lampshade 300 is spherical, the diameters of the support rings 110 gradually increase and then gradually decrease from top to bottom. When the flexible lampshade 300 is cylindrical, the diameters of the multiple support rings 110 are the same. In the embodiment, the light strip 210 is fixedly connected around the support rings 110. Specifically, the light strip 210 does not need to be fixed to each of the support rings 110, and the user is able to fix the light strip to part of support rings 110 disposed at intervals according to actual needs (such as fixing the light strip to one of each two adjacent support rings 110 of the support rings), which ensures a lighting effect of the light strip 210 while reducing the amount of materials and mounting steps.

When unfolded, the skeleton 100 and the flexible lampshade 300 form a mechanical coupling system. Under a synergistic effect of a radial support force of the skeleton 100 and a circumferential tensile force of the flexible lampshade 300, a three-dimensional lantern shape of the lantern-shaped decorative lamp is formed. Since the support rings 110 are spaced apart from each other and the flexible lampshade 300 is flexible, in the storage state, the support rings 110 are collapsed to be close to each other, and the flexible lampshade 300 is deformed and stacked during a collapsing process of the support rings 110. In the embodiment, the skeleton 100 has a simple structure, and unfolding and folding operations thereof are convenient.

In some embodiments, the skeleton 100 further comprises a counterweight piece 120. The counterweight piece 120 is connected to a middle lower position of the flexible lampshade 300. When the flexible lampshade 300 is in a hanging state, a lower portion of the flexible lampshade 300 automatically unfolds under gravity of the counterweight piece 120. Optionally, the counterweight piece 120 is connected to the bottom portion of the flexible lampshade 300. Specifically, when the lantern-shaped decorative lamp 10 is in a hanging state, a top portion of the lantern-shaped decorative lamp 10 is relatively fixed, and the counterweight piece 120 is connected to the middle and lower portion of the flexible lampshade 300. The gravity of the counterweight piece 120 drives the lower portion of the flexible lampshade 300 to unfold downward. When mounting the lantern-shaped decorative lamp 10 of the present disclosure, the user only needs to hang the lantern-shaped decorative lamp 10, and the counterweight piece 120 automatically pulls down the flexible lampshade 300 by the gravity to unfold the flexible lampshade 300. Therefore, the user does not need to manually dispose and unfold the flexible lampshade 300, thereby simplifying the mounting process and improving mounting efficiency.

In addition, the counterweight piece 120 further makes a gravity center of the lantern-shaped decorative lamp 10 relatively low. When the lantern-shaped decorative lamp 10 is subjected to external forces such as breeze and airflow when hanging, the counterweight piece 120 reduces shaking possibility and maintains stability of the lantern-shaped decorative lamp 10 by its own weight.

In the related art, a support rod is provided to unfold a lampshade. In this solution, the user needs to mount the support rod at a fixed position of the skeleton, and a length of the support rod is matched with a height of the lampshade. If the height of the decorative lamp needs to be changed, the support rod needs to be replaced, which is complicated and costly. However, in the present disclosure, when the lantern-shaped decorative lamp 10 is hung up, the flexible lampshade 300 automatically unfolds under the gravity of the counterweight piece 120 without complicated mounting steps, which greatly improves the mounting efficiency.

In some embodiments, as shown in FIG. 3, the counterweight piece 120 is a counterweight ring 121. The counterweight ring 121 and the support rings 110 are coaxially disposed. The counterweight ring 121 is attached to the inner wall surface of the flexible lampshade 300. The counterweight ring 121 is connected to a bottom end of the flexible lampshade 300. A weight of the counterweight ring 121 may be greater than a weight of the support rings 110. In the embodiment, the counterweight ring 121 further supports the bottom portion of the flexible lampshade 300. Moreover, the gravity of the counterweight ring 121 drives the flexible lampshade to stretch downward. When unfolding the lantern-shaped decorative lamp, the counterweight ring 121 causes the flexible lampshade to be evenly stressed from the top to the bottom, allowing the flexible lampshade to be fully unfolded, presenting a full and regular lantern shape, avoiding local wrinkles or depressions in the flexible lampshade, and enhancing the aesthetics of the lantern-shaped decorative lamp.

In some embodiments, a thickness of the counterweight ring 121 is greater than a thickness of any one of the support rings 110. In the embodiment, the counterweight ring 121 and the support rings 110 are made of the same material, and the weight of the counterweight ring 121 is made greater than the weight of any one of the support rings 110 by setting the thickness of the counterweight ring 121 to be greater than the thickness of any one of the support rings. In other embodiments, the counterweight ring 121 and the support rings 110 are made of different materials to make the counterweight ring 121 heavier.

In some embodiments, as shown in FIG. 4, the counterweight piece 120 comprises at least one counterweight block 122, and the at least one counterweight block 122 are connected to one of the support rings 110 located on a lower portion of the lantern-shaped decorative lamp 10. The at least one counterweight block 122 is optionally connected to a bottom-most support ring 110, and the at least one counterweight block 122 is detachably connected to the bottom-most support ring 110. In the embodiment, a volume, a weight and the number of the at least one counterweight block 122 are adjusted according to actual needs. Optionally, the at least one counterweight block 122 comprises counterweight blocks 122, and the counterweight blocks 122 are disposed on the bottom-most support ring 110 at uniform intervals, so that a pulling force of the counterweight blocks 122 on the lower portion of the flexible lampshade 300 is relatively uniform.

Figure 5:
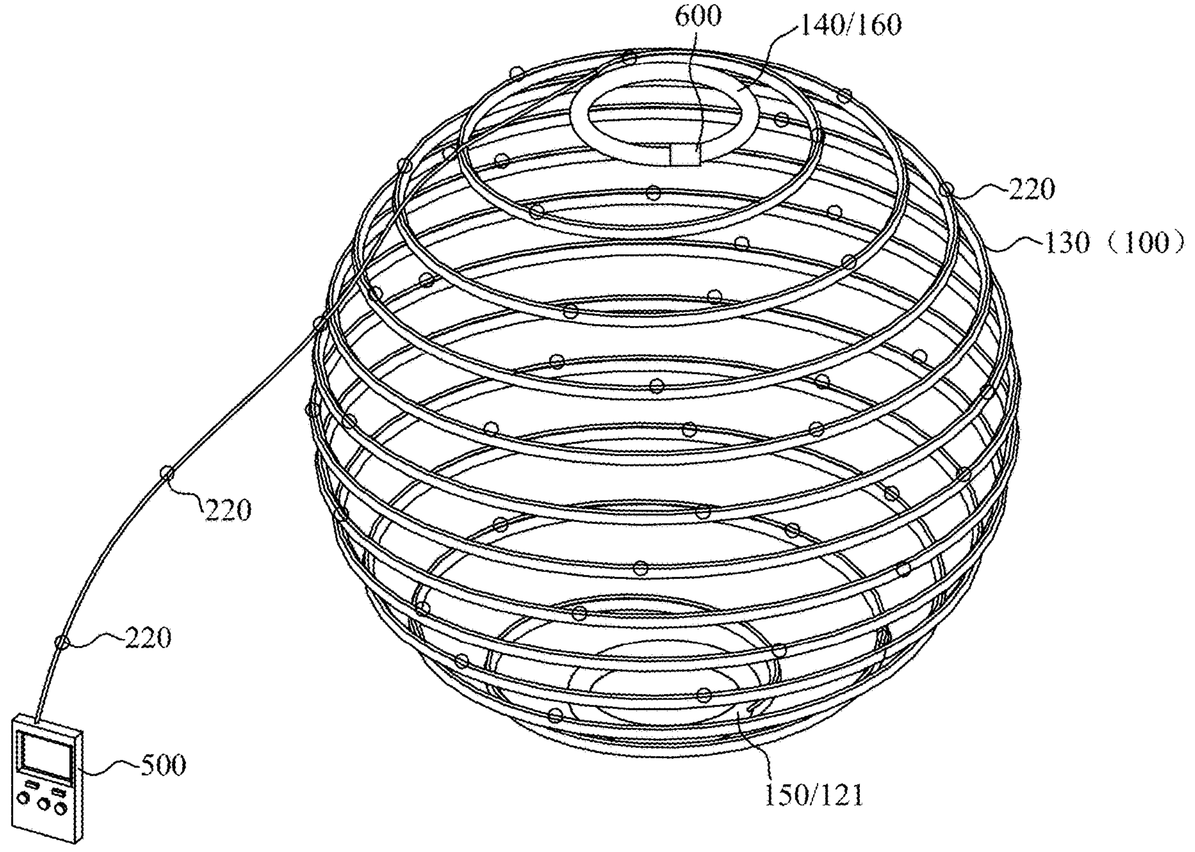
FIG. 5 is a schematic diagram of the skeleton according to a second embodiment of the present disclosure.
Figure 6:
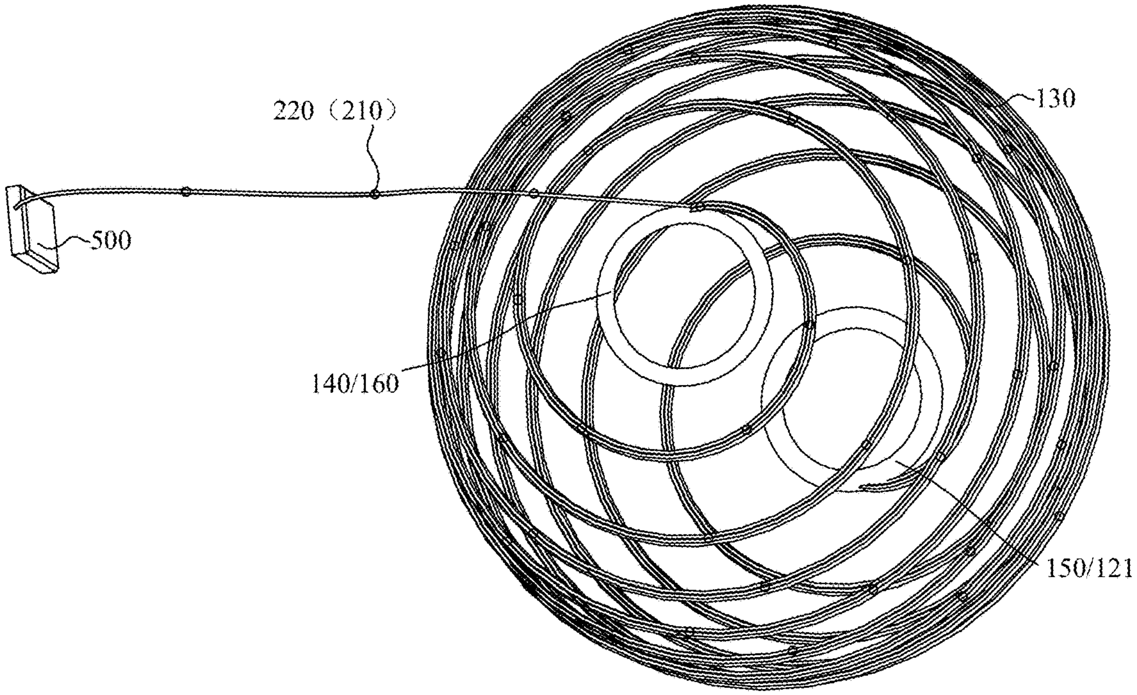
FIG. 6 is another schematic diagram of the skeleton according to the second embodiment of the present disclosure.
Figure 7:
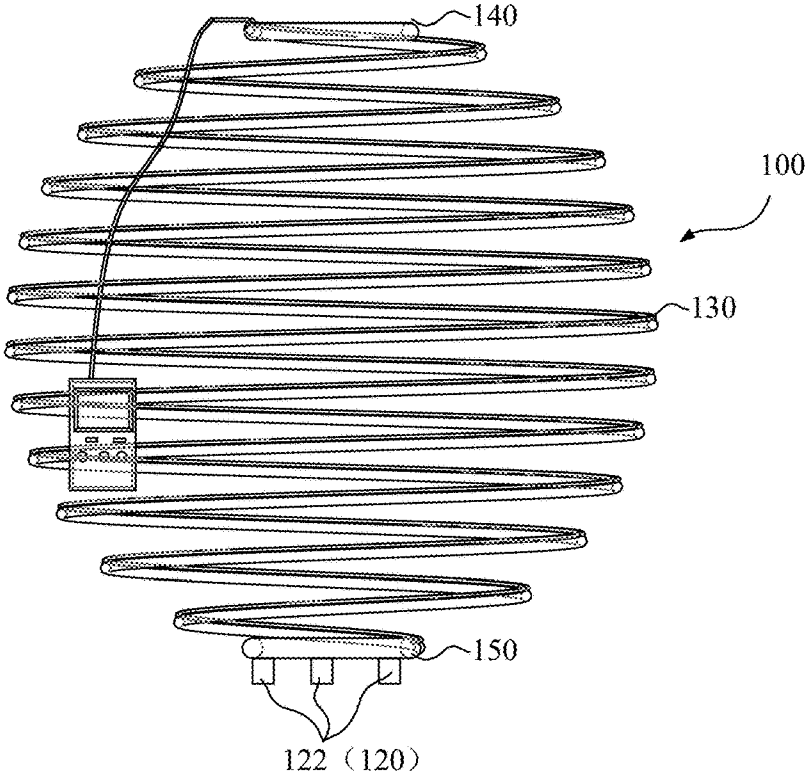
FIG. 7 is a front side schematic diagram of the skeleton according to the second embodiment of the present disclosure.

In some embodiments, as shown in FIGS. 5-7, the skeleton 100 comprises a frame 130 formed by spirally winding a metal wire, and the frame 130 is attached to an inner wall surface of the flexible lampshade 300. In this way, the frame 130 has good flexibility and plasticity, and is able to adapt to natural tension during the unfolding process, so that the flexible lampshade 300 presents a smooth curve.

In some embodiments, as shown in FIGS. 5-7, the skeleton 100 further comprises a first fixing ring 140 and a second fixing ring 150. The first fixing ring 140 is connected to a top end of the frame 130, and the second fixing ring 150 is connected to a bottom end of the frame 130. The frame 130 and the first fixing ring 140 and the second fixing ring 150 are fixed as a whole by welding, snapping, binding, etc. The first fixing ring 140 and the second fixing ring 150 enable the frame 130 to maintain an overall frame structure and prevent the frame 130 from deforming. In the unfolded state, the frame 130 provides radial support and stretches in the vertical direction to drive the flexible lampshade 300 to unfold in the vertical direction, thereby forming the three-dimensional lantern structure.

A weight of the second fixing ring 150 is greater than a weight of the first fixing ring 140. Namely, the second fixing ring 150 is configured as the counterweight ring 122, and the second fixing ring 150 is configured to support the frame 130 and the flexible lampshade 300 while providing pulling force for driving the flexible lampshade 300 to automatically unfold.

As shown in FIG. 7, in other embodiments, at least one counterweight block 122 is disposed on the second fixing ring 150, which may refer to the embodiment where the at least one counterweight block is disposed on one of the support rings.

In some embodiments, in the unfolded state, the flexible lampshade 300 is in a sphere shape. Opening are respectively defined on a top end and a bottom end of the flexible lampshade 300, and the openings communicate an internal space of the flexible lampshade 300 with an outside. The openings at the top end and bottom end communicate the internal space of the flexible lampshade 300 with the outside. Light is able to be scattered outward through the openings. The openings further facilitate air circulation between the internal space of the flexible lampshade 300 and the outside, thereby preventing the temperature of the internal space of the flexible lampshade 300 from being too high due to heat generated by the light strip, and extending the service life.

Figure 8:
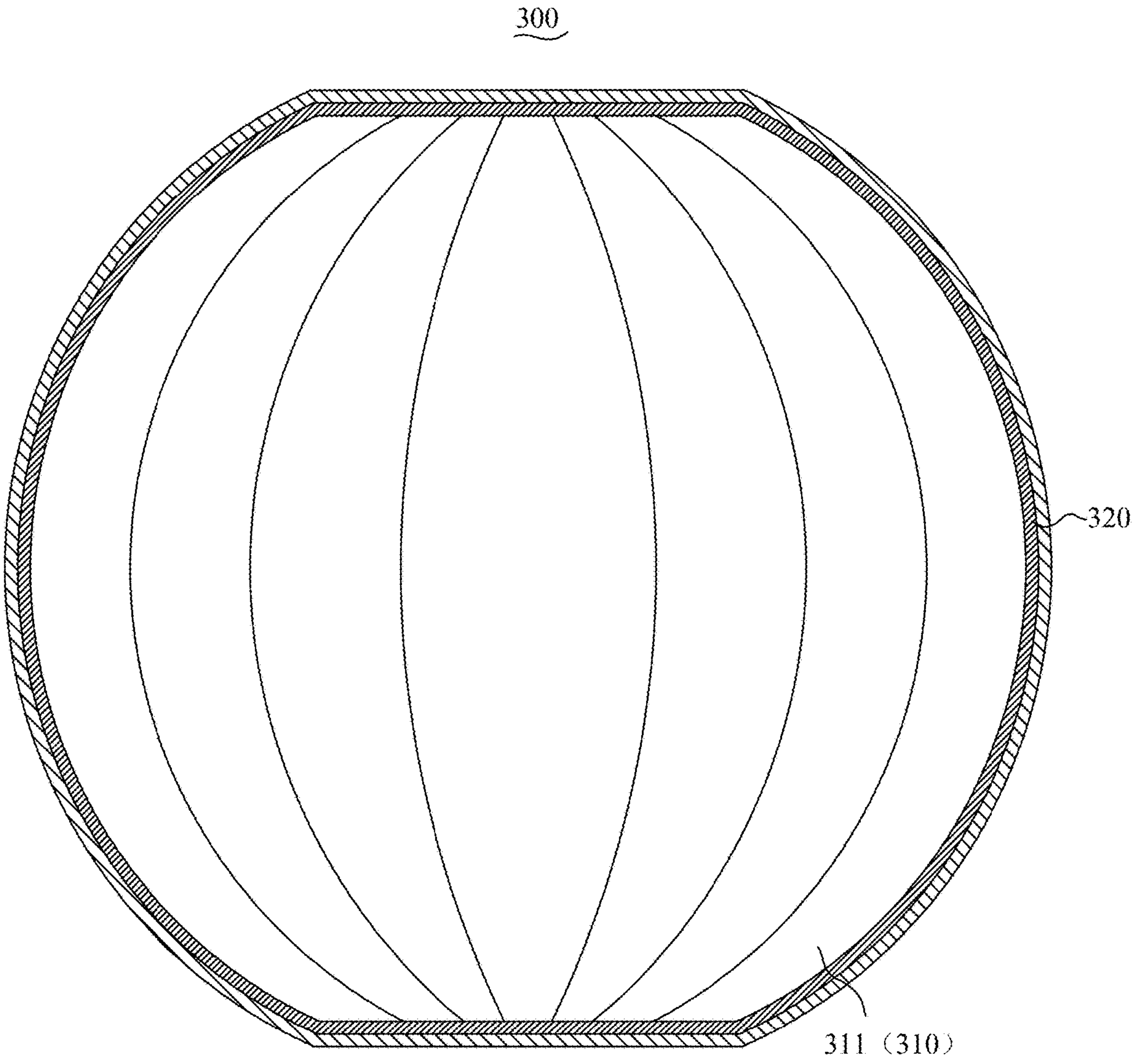
FIG. 8 is a schematic diagram of a flexible lampshade according to a third embodiment of the present disclosure.

In some embodiments, as shown in FIGS. 1 and 8, the flexible lampshade 300 comprises an inner lampshade 310 and a decorative outer lampshade 320. The inner lampshade 310 comprises first connecting pieces 311 and the inner lampshade is connected to the skeleton 100. The first connecting pieces 311 are sequentially spliced in a circumferential direction of the la 321 ntern-shaped decorative lamp to form the flexible lampshade of a spherical shape. The decorative outer lampshade 320 comprises second connecting pieces 321, and the second connecting pieces 321 are sequentially spliced and detachably connected to an outer surface of the inner lampshade 310.

Specifically, the flexible lampshade 300 comprises the first connecting pieces 311, and the first connecting pieces 311 are sequentially spliced in the circumferential direction of the lantern-shaped decorative lamp 10 to form the spherical shape. The first connecting pieces 311 are connected together by bonding, sewing, stapling, etc. The inner lampshade 310 is connected to the skeleton 100. The inner lampshade 310 is the main load-bearing structure of the flexible lampshade 300, and inner lampshade 310 is made of a woven fabric, such as polyester fabric. In this way, the inner lampshade 310 has good tensile strength. In the embodiment where the skeleton 100 is composed of the support rings 110, the inner lampshade 310 bears the weight of the support rings 110, prevents the flexible lampshade 300 from being excessively deformed in the vertical direction, and maintains the overall shape of the flexible lampshade 300 stable.

The decorative outer lampshade 320 comprises the second connecting pieces 321. The second connecting pieces 321 are detachably connected to the outer surface of the inner lampshade 310. The second connecting pieces 321 mainly play a decorative effect. The user is able to replace the decorative outer lampshade 320 with different colors, patterns, and materials according to different festivals, occasions, or personal preferences, so as to achieve a variety of decorative styles. The second connecting pieces 321 are able to be connected together by magnetic attraction, snap connection, etc., and the second connecting pieces 321 are able to be fixed to the outer surface of the inner lampshade 310 by magnetic attraction, snap connection, etc. Snap components or magnetic components are disposed on two sides of each second connecting pieces 321. The snap components or the magnetic components are configured to connect to corresponding two adjacent second connecting piece 321 and the inner lampshade 310.

In some embodiments, the second connecting pieces jointly define at least one hollow pattern area (not shown in the drawings) for transmitting light. A light-transmitting design of the second connecting pieces 321 enables the present disclosure to present two decorative effects. Specifically, when the light strip 210 is lit, the light emitted by the light strip 210 directly passes through the at least one hollow pattern area to form a highlight pattern, and at the same time, the light emitted by the light strip 210 is blocked by non-hollow areas of the second connecting pieces 321, thereby projecting a pattern outline with light and dark contrast on the outer surface of the flexible lampshade 300. In some embodiments, the at least one hollow pattern area comprises hollow pattern areas, and the hollow pattern areas are disposed in a form of traditional patterns (such as cloud patterns, bat patterns), zodiac patterns, geometric pattern arrays, etc. In some other embodiments, the non-hollow areas of the second connecting pieces 321 are designed as a complex shape such as a silhouette of a person, an animal or a building. When the lighting component 200 is lit, the light passes through the hollow pattern areas to form a highlight outline, while the non-hollow areas block the light to project a contrasting silhouette effect, such as a silhouette of a person (Chinese shadow puppetry), a natural silhouette (such as bamboo branches, flying birds, etc. with oriental aesthetic characteristics). In this way, the lantern-shaped decorative lamp 10 presents a rich and diverse decorative effect, significantly improving the visual expression.

In some embodiments, the light strip 210 comprises lamp beads 220 disposed at intervals. A distance between any two adjacent lamp beads 220 is not less than 3 cm and not greater than 10 cm. In this way, the light emitted by the lamp beads 220 is evenly distributed to avoid a situation where the light is too concentrated or sparse, and sufficient heat dissipation space is provided for the lamp beads 220 to reduce a risk of overheating damage.

In some embodiments, as shown in FIG. 1, the lantern-shaped decorative lamp 10 further comprises a hanging assembly 400. The hanging assembly 400 comprises a connecting rope 410 and a hook 420 connected to the connecting rope 410. The skeleton 100 further comprises a connecting ring 160. The connecting ring 160 is connected to a top end of the flexible lampshade 300. Two opposite sides of the connecting ring 160 are protruded upward to define connecting portions and connecting grooves 161. The connecting grooves 161 face downward. The connecting rope 410 is connected to the connecting ring 160 and two ends of the connecting rope 410 are respectively disposed in the connecting grooves 161. When the hook 420 hooks an external component, the skeleton 100 and the flexible lampshade 300 are hung through the connecting rope 410. Specifically, in the embodiment where the skeleton 100 is composed of the support rings 110, the connecting ring 160 is a top-most support ring 110, and the top-most support ring 110 comprises the connecting portions protruding upward that define the connecting grooves 161 facing downward. In the embodiment where the skeleton 100 is the frame 130, the connecting ring 160 is the first fixing ring 140, and the first fixing ring 140 comprises the connecting portions protruding upward that define the connecting grooves 161 facing downward. The connecting grooves 161 play a positioning effect, which prevent the connecting rope 410 from sliding or loosening on the connecting ring 160, ensure the reliability of the connection, and facilitate the symmetrical mounting of the connecting rope 410 to prevent the lantern-shaped decorative lamp 10 from tilting in the hanging state.

In some embodiments, as shown in FIG. 1, the connecting ring 160 is connected to the flexible lampshade 300 except for portions where the connecting portions are disposed, so that the connecting grooves 161 and the flexible lampshade 300 jointly define connecting holes, and the connecting rope 410 passes through the connecting holes. In this way, the connecting rope 410 is prevented from being separated from the connecting grooves 161.

It should be noted that the connecting rope 410 may be a hemp rope, a chain, etc., which is not limited thereto.

In some embodiments, as shown in FIG. 1, the lantern-shaped decorative lamp 10 further comprises a control device 510 and a battery 520. The control device 510 is configured to control a color of light emitted by the light strip 210 and/or control a flashing frequency of the light strip 210. The battery 520 is configured to supply power to the light strip 210 and the control device 510. Such an arrangement adds more dynamics and fun to the lantern-shaped decorative lamp 10, and meets decorative lighting effects of different occasions and needs.

In some embodiments, as shown in FIG. 5, the lantern-shaped decorative lamp 10 further comprises a photosensitive sensor 600. The photosensitive sensor 600 is in communication with the control device 510. When the photosensitive sensor 600 detects that an ambient light intensity is less than a predetermined threshold, the control device 510 is configured to control the light strip 210 to emit light. Specifically, the photosensitive sensor 600 is configured to detect the ambient light intensity in real time. When the ambient light intensity is less than the predetermined threshold, the photosensitive sensor 600 transmits a signal to the control device 510, and the control device 510 controls the light strip 210 to emit light, thereby automatically turning on the lantern-shaped decorative lamp 10. For example, in the evening, as the sky gradually darkens, the photosensitive sensor 600 detects that the ambient light intensity decreases, and the light strip 210 automatically lights up without manual operation, thereby providing a convenient user experience for the user.

In some embodiments, as shown in FIG. 1, the lantern-shaped decorative lamp 10 further comprises a control box 500, and the control device 510 and the battery 520 are disposed in the control box 500. The battery 520 is a solar cell. The photosensitive sensor 600 is mounted on the control box 500 or the skeleton 100. The control device 510 and the battery 520 are both mounted in the control box 500, and the control box 500 protects the control device 510 and the battery 520 from being disturbed and damaged by the external environment, thereby improving the stability and reliability of the lantern-shaped decorative lamp. The solar cell 520 is configured as a power source, and fully utilizes solar energy for charging the lantern-shaped decorative lamp, which is not only environmentally friendly and energy-saving, but also eliminates the trouble of frequently replacing the battery 520, making the lantern-shaped decorative lamp 10 convenient, practical, and suitable for use in various outdoor places or places where it is difficult to access the power supply. Of course, in other embodiments, the lantern-shaped decorative lamp 10 further comprises a plug, and the plug is connected to an external power supply to power the control device 510 and the light strip 210.

Optionally, the photosensitive sensor 600 is mounted in the control box 500, and a detecting portion of the photosensitive sensor 600 is extended from the control box 500 or is exposed, so as to detect ambient light. In the embodiment, the photosensitive sensor 600 is prevented from being directly damaged by the external environment, such as rain, dust, collision, etc., and the service life of the photosensitive sensor 600 is extended.

Optionally, the photosensitive sensor 600 is mounted on the skeleton 100, so the photosensitive sensor 600 more directly senses the ambient light intensity, and a detection result is accurate. For example, when other objects around the lantern-shaped decorative lamp block the light, the photosensitive sensor 600 on the skeleton 100 is able to detect the change of the ambient light intensity in time, so as to accurately control the switch of the light strip 210. The specific mounting position of the photosensitive sensor 600 is not limited thereto.

Figure 9:
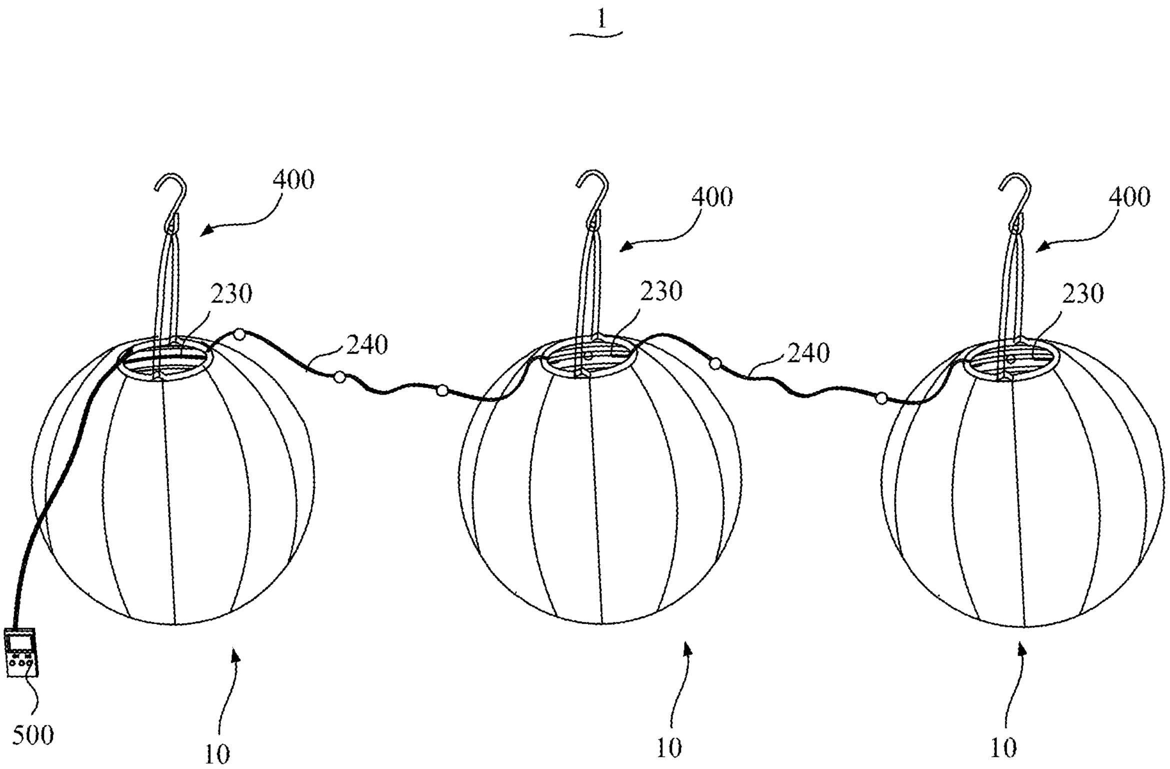
FIG. 9 is a schematic diagram of a lighting device of the present disclosure.

In a second aspect, as shown in FIG. 9, the present disclosure provides a lighting device 1. The lighting device 1 comprises a plurality of lantern-shaped decorative lamps 10 mentioned above. The plurality of lantern-shaped decorative lamps 10 shares the light strip 210. The number of the plurality of lantern-shaped decorative lamps 10 is two, three, four, five, etc. The light strip 210 sequentially passes through the skeletons 100 of the plurality of lantern-shaped decorative lamps 10. Each two adjacent lantern-shaped decorative lamps 10 are spaced. A first trip section of the light strip 210 disposed in each skeleton 100 is configured as a main light-emitting section 230 of the light strip 210. A second trip section of the light strip 210 disposed between each two adjacent lantern-shaped decorative lamps 10 is configured as a connecting section 240 of the light strip 210.

In the embodiment, the light strip 210 extends from the skeleton 100 of one of the plurality of lantern-shaped decorative lamps 10 to another, so that the plurality of lantern-shaped decorative lamps 10 are connected as a whole visually, rather than separated lantern-shaped decorative lamps. For example, in an outdoor courtyard or a commercial block, the plurality of lantern-shaped decorative lamps 10 are disposed along a street or a specific area, and the light strip 210 connects the plurality of lantern-shaped decorative lamps in series like a flowing light strip, forming a unique landscape shape, which enhances the artistic sense and visual appeal of the outdoor courtyard or the commercial block.

Since the light strip 210 connects the plurality of lantern-shaped decorative lamps 10, the control device 510 is able to control the lighting device 1. The user is able to adjust the color, the flashing frequency, the brightness, and other parameters of the plurality of lantern-shaped decorative lamps 10 at the same time through the control device to achieve a unified lighting effect. For example, when holding a large-scale event, according to the progress and atmosphere requirements of the large-scale event, the user is able to switch a light mode of the plurality of lantern-shaped decorative lamps 10 by controlling a button of the control device 510.

Compared with wiring each of the lantern-shaped decorative lamps 10 separately, the embodiment of connecting the plurality of lantern-shaped decorative lamps 10 in series via the light strip 210 greatly reduces the number and complexity of wiring. Simply by connecting the light strip 210 from one of the plurality of lantern-shaped decorative lamps 10 to another lantern-shaped decorative lamp 10, an electrical connection of the lighting device 1 is achieved, thereby reducing the difficulty and cost of mounting of the lighting device. At the same time, it further reduces the clutter of lines, making a mounting pace tidy and beautiful. The user is able to quickly connect the plurality of lantern-shaped decorative lamps 10 through the light strip 210 without the need for wiring and connection work, which greatly shortens mounting time. The efficient mounting method has obvious advantages, especially in occasions where the lighting device 1 needs to be quickly disposed, such as event sites, temporary sites, etc.

In the drawings of the embodiments, the same or similar numbers correspond to the same or similar components; in the description of the present disclosure, it should be understood that terms such as "upper", "lower", "left", "right" etc. indicate direction or position relationships shown based on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be comprised in the protection scope of the present disclosure.

What is claimed is:

1. A lantern-shaped decorative lamp, comprising:

a skeleton;

a lighting component;

a flexible lampshade;

wherein the skeleton is unfoldable or collapsable in a vertical direction, the lighting component is mounted on the skeleton, and the flexible lampshade is wrapped around an outer side of the skeleton;

wherein in an unfolded state, the skeleton and the flexible lampshade are unfolded to unfold the lantern-shaped decorative lamp, and in a storage state, the skeleton and the flexible lampshade are collapsed in the vertical direction to minimize a volume of the lantern-shaped decorative lamp;

wherein the lantern-shaped decorative lamp further comprises a hanging assembly, and the hanging assembly comprises a connecting rope and a hook connected to the connecting rope;

wherein the skeleton further comprises a connecting ring, the connecting ring is connected to a top end of the flexible lampshade, and two opposite sides of the connecting ring are protruded upward to define connecting portions and connecting grooves, and the connecting grooves face downward;

wherein the connecting rope is connected to the connecting ring and two ends of the connecting rope are respectively disposed in the connecting grooves;

wherein the connecting ring is connected to the flexible lampshade except for portions where the connecting portions are disposed, so that the connecting grooves and the flexible lampshade jointly define connecting holes, and the connecting rope passes through the connecting holes.

2. The lantern-shaped decorative lamp according to claim 1, wherein the lighting component is a light strip, and the light strip extends in an extending direction of the skeleton and is fixed to the skeleton.

3. The lantern-shaped decorative lamp according to claim 2, wherein the skeleton comprises support rings coaxially disposed from top to bottom, the support rings are attached to an inner wall surface of the flexible lampshade, diameters of the support rings are matched with an inner diameter of the flexible lampshade from top to bottom, and the support rings are adapted to an outer contour of the flexible lampshade.

4. The lantern-shaped decorative lamp according to claim 3, wherein the skeleton further comprises a counterweight piece, the counterweight piece is connected to a middle lower position of the flexible lampshade, and when the flexible lampshade is in a hanging state, a lower portion of the flexible lampshade automatically unfolds under gravity of the counterweight piece.

5. The lantern-shaped decorative lamp according to claim 4, wherein the counterweight piece is a counterweight ring, the counterweight ring and the support rings are coaxially disposed, the counterweight ring is attached to the inner wall surface of the flexible lampshade, and the counterweight ring is connected to a bottom end of the flexible lampshade.

6. The lantern-shaped decorative lamp according to claim 5, wherein a thickness of the counterweight ring is greater than a thickness of any one of the support rings.

7. The lantern-shaped decorative lamp according to claim 4, wherein the counterweight piece is at least one counterweight block, and the at least one counterweight block is connected to one of the support rings located on a lower portion of the lantern-shaped decorative lamp.

8. The lantern-shaped decorative lamp according to claim 2, wherein the lantern-shaped decorative lamp further comprises a control device and a battery, the control device is configured to control a color of light emitted by the light strip and/or control a flashing frequency of the light strip, and the battery is configured to supply power to the light strip and the control device.

9. The lantern-shaped decorative lamp according to claim 8, wherein the lantern-shaped decorative lamp further comprises a photosensitive sensor, the photosensitive sensor is in communication with the control device, and when the photosensitive sensor detects that an ambient light intensity is less than a predetermined threshold, the control device is configured to control the light strip to emit light.

10. The lantern-shaped decorative lamp according to claim 9, wherein the lantern-shaped decorative lamp further comprises a control box, and the control device and the battery are disposed in the control box;

wherein the battery is a solar cell, and the photosensitive sensor is mounted on the control box or the skeleton.

11. The lantern-shaped decorative lamp according to claim 2, wherein the skeleton comprises a frame formed by spirally winding a metal wire, and the frame is attached to an inner wall surface of the flexible lampshade.

12. The lantern-shaped decorative lamp according to claim 11, wherein the skeleton further comprises a first fixing ring and a second fixing ring;

wherein the first fixing ring is connected to a top end of the frame, and the second fixing ring is connected to a bottom end of the frame;

wherein a weight of the second fixing ring is greater than a weight of the first fixing ring, or at least one counterweight block is disposed on the second fixing ring, so that a lower portion of the flexible lampshade automatically unfolds under gravity of the second fixing ring when the flexible lampshade is in a hanging state.

13. The lantern-shaped decorative lamp according to claim 2, wherein the light strip comprises lamp beads disposed at intervals, and a distance between any two adjacent lamp beads is not less than 3 cm and not greater than 10 cm.

14. The lantern-shaped decorative lamp according to claim 1, wherein in the unfolded state, the flexible lampshade is in a sphere shape;

wherein openings are respectively defined on a top end and a bottom end of the flexible lampshade, and the openings communicate an internal space of the flexible lampshade with an outside.

15. The lantern-shaped decorative lamp according to claim 14, wherein the flexible lampshade comprises first connecting pieces, and the first connecting pieces are sequentially spliced in a circumferential direction of the lantern-shaped decorative lamp to form the flexible lampshade of a spherical shape.

16. The lantern-shaped decorative lamp according to claim 15, wherein the flexible lampshade comprises an inner lampshade and a decorative outer lampshade, the inner lampshade comprises the first connecting pieces, the inner lampshade is connected to the skeleton, the decorative outer lampshade comprises second connecting pieces, and the second connecting pieces are sequentially spliced and detachably connected to an outer surface of the inner lampshade.

17. The lantern-shaped decorative lamp according to claim 16, wherein the second connecting pieces jointly define at least one hollow pattern area for transmitting light.

18. A lighting device, comprising:

a light strip; and a plurality of lantern-shaped decorative lamps;

wherein the lantern-shaped decorative lamps comprise skeletons, lighting components, and flexible lampshades;

wherein the skeletons are unfoldable or collapsable in a vertical direction, each of the lighting components is mounted on a corresponding one of the skeletons, and each of the flexible lampshades is wrapped around an outer side of a corresponding one of the skeletons;

wherein in an unfolded state, the skeletons and the flexible lampshades are unfolded to unfold the plurality of lantern-shaped decorative lamps, and in a storage state, the skeletons and the flexible lampshades are collapsed in the vertical direction to minimize a volume of the plurality of lantern-shaped decorative lamps;

wherein the light strip extends in an extending direction of each of the skeletons and is fixed to each of the skeletons, and the light strip sequentially passes through the skeletons of the plurality of lantern-shaped decorative lamps;

wherein each two adjacent lantern-shaped decorative lamps are spaced, a first trip section of the light strip disposed in each of the skeletons is configured as a main light-emitting section of the light strip, and a second trip section of the light strip disposed between each two adjacent lantern-shaped decorative lamps is configured as a connecting section of the light strip.

* * * * *